Nov. 7, 1939.  S. RUBEN  2,178,969
POTENTIAL PRODUCING CELL
Filed May 24, 1937
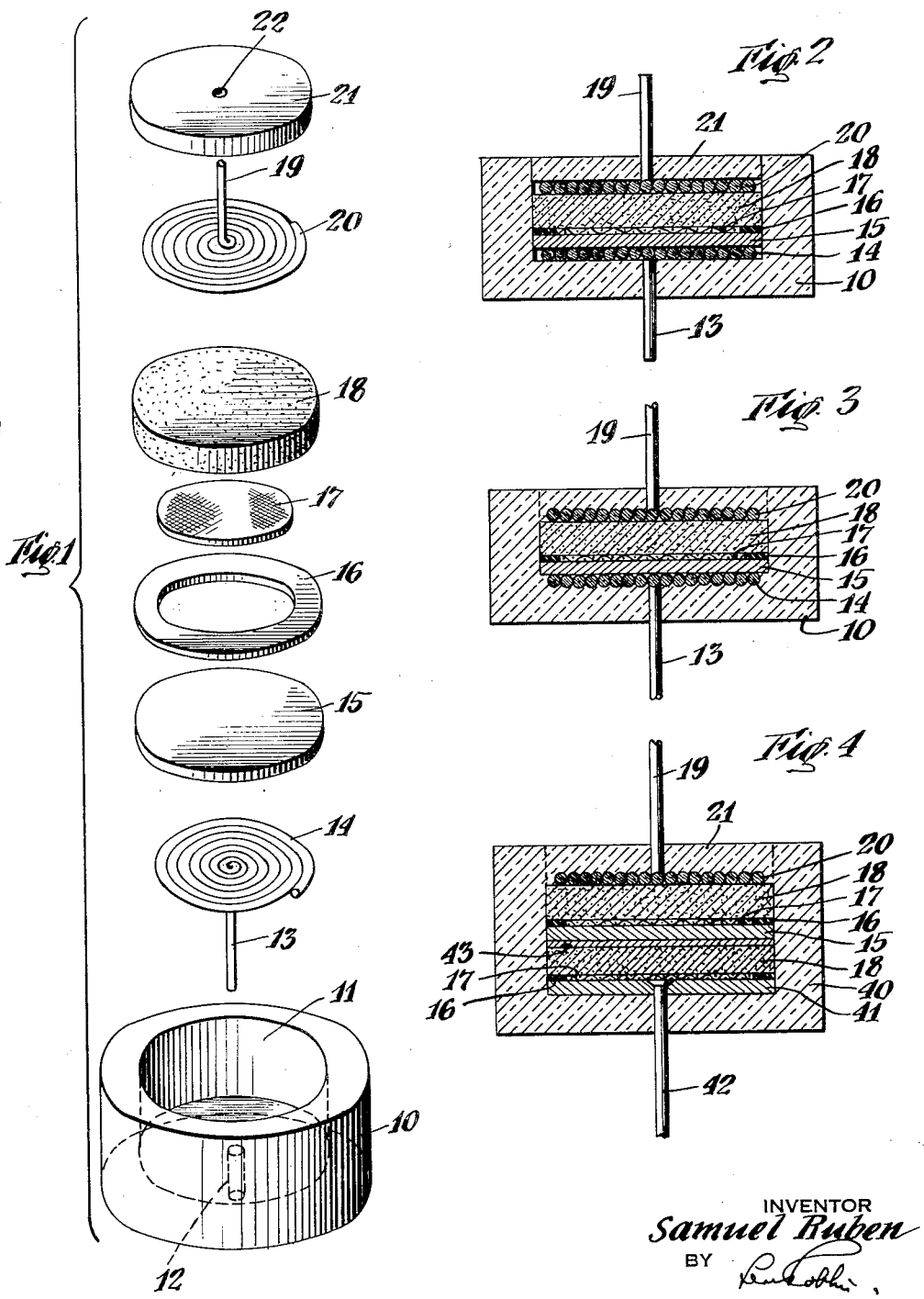
INVENTOR
*Samuel Ruben*
BY
ATTORNEY Patented Nov. 7, 1939

2,178,969

UNITED STATES PATENT OFFICE 2,178,969

POTENTIAL PRODUCING CELL

Samuel Ruben, New Rochelle, N. Y.

Application May 24, 1937, Serial No. 144,334

10 Claims. (Cl. 136—100)

This invention relates to electric potential producing cells.

An object of the invention is to improve potential cells of the type disclosed.

Other objects of the invention will be apparent from the following description and accompanying drawing taken in connection with the appended claims.

The invention comprises the features of construction, combination of elements, arrangement of parts, and methods of manufacture and operation referred to above or which will be brought out and exemplified in the disclosure hereinafter set forth, including the illustrations in the drawing.

In the drawing:

Figure 1 is an exploded view of a potential producing cell embodying features of the invention;

Figure 2 is a cross section of the potential cell assembly prior to the final molding operation;

Figure 3 is a similar section after molding; and

Figure 4 is a section of a multiple cell.

A feature of the present invention is the provision of an enclosing shell of molded insulating material for the potential cell elements. Other features will be apparent from the following detailed description.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

The invention is particularly applicable to potential cells which are free from gas pressure effects and especially to cells of the type disclosed in my Patent 1,920,151 and in my co-pending applications Serial Numbers 85,661, filed June 17, 1936, and 121,753, filed January 22, 1937. These cells are of the type capable of maintaining a potential over a long time without deterioration.

The cell may comprise negative and positive electrodes, an electrolyte and an enclosing casing or shell of molded insulating material such as resin. According to one aspect of the invention the insulating molding material is of such composition that it will flow or mold at a temperature below the boiling point of the electrolyte.

In a preferred form the cell may utilize a negative electrode disc of zinc or cadmium, a positive electrode disc of vanadium pentoxide and an electrolyte made by heating 90 grams of ethylene glycol, 90 grams of boric acid and 21 c. c. of 28% ammonia solution to 140° C.

The electrolyte is thus of such a composition as to develop a potential difference between the positive and negative electrodes and to maintain the potential difference over long periods of time without substantially dissolving the electrodes. The cell is substantially incapable of producing current but is admirably suited for uses where a potential is to be applied without current being used such as for biasing the electrodes of electronic discharge devices. The vanadium pentoxide, in addition to serving as the positive electrode also assists in limiting any tendency toward polarizing which might occur if an electrode material such as carbon were used.

Referring to the drawing Figures 1, 2 and 3 illustrate the assembly of a single couple potential cell. A preliminary molded shell 10 is provided which will later be further molded to form the case of the cell. The shell 10 is formed of a water impervious moldable resin and may preferably be formed of methyl methacrylate polymer, a transparent molded resin which may be softened so as to flow and be molded at 120° C. or below. The shell 10 is provided with a central cylindrical recess 11 and a small axial hole 12 to receive a terminal wire 13. The terminal wire 13 is wound into a flat spiral 14 having one end extending perpendicularly out of the middle of the spiral to extend through hole 12 and form an external connection to one electrode of the cell. The negative electrode 15 comprising a disc of zinc, cadmium or the like rests against the face of spiral 14.

A thin ring 16 of soft rubber or other similar sealing material of substantially the same external diameter as disc 15 is superimposed on the disc and within the hollow thus formed is placed a smaller disc 17 of purified fabric or other similar absorbent material saturated with the viscous electrolyte.

Positive electrode 18 of vanadium pentoxide or other suitable material is superimposed on members 16 and 17 and then a terminal wire 19 coiled into a flat spiral 20 similar to spiral 14 is placed in contact with electrode 18.

Finally, a disc 21 of similar composition to the shell 10 and having a central hole 22 to receive terminal wire 19 is placed over the assembly. The cross section of the assembly, as now prepared, is shown in Figure 2.

The assembled cell is now placed in a suitable press where it is heated to about 120° C. and at which point the resin parts 10 and 21 are softened and flow into all recesses in the edges of the electrodes and in the terminals so as to completely seal the edges of the discs. The resin members 10 and 21 also flow together so as to hermetically seal the cell whereby there is no possibility of escape of electrolyte or entrance of impurities. The terminal wires 13 and 19 provide connecting means to the associated circuit with which the cell is to be used. The finished molded cell is shown in cross section in Figure 3.

Figure 4 shows a modification wherein two cell couples are placed in series in a single unit. In this modification the shell 40 has a sufficiently deep central recess to accommodate the added parts required. A further modification involves the use of a wire terminal 42 of the same metal as the negative electrode disc 41, the wire 42 being passed through the center of disc 41 and flattened or spread to secure it to the disc, as shown.

A disc 43 of carbonized nickel or other non-polarizing material is preferably inserted between the positive electrode 18 of one couple and negative electrode 15 of the next adjacent couple to eliminate any possibility of a counter E. M. F. being developed at this junction.

It will be obvious that a cell of any desired number of couples can be formed in this manner.

The cell as thus formed insures freedom from atmospheric effects and from drying out or loss of the electrolyte. The sealing along the edge of each electrode also prevents any possible creepage of electrolyte from cell to cell so that the electrolyte is confined where required and the other contacting portions are kept free of electrolyte.

By using a molding resin such as methyl methacrylate having a flow point at a lower temperature than the boiling point of the electrolyte, there is no danger of volatilization during molding.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A potential producing cell comprising a negative electrode, a positive electrode, an electrolyte contacting said electrodes and a molded resin shell enclosing and hermetically sealing said electrodes and electrolyte.

2. A potential producing cell comprising a negative electrode, a positive electrode, an electrolyte contacting said electrodes and a molded resin shell enclosing and hermetically sealing said electrodes and electrolyte, said resin being moldable at a temperature below the boiling point of said electrolyte.

3. A potential producing cell comprising a negative electrode disc, a positive electrode disc in spaced parallel relation thereto, an electrolyte between said electrodes and in contact therewith and a molded resin shell enclosing and hermetically sealing said electrodes and electrolyte therein.

4. A potential producing cell comprising a negative electrode disc, a positive electrode disc in spaced parallel relation thereto, an electrolyte between said electrodes and in contact therewith and a molded resin shell enclosing and hermetically sealing said electrodes and electrolyte therein, said resin shell sealing the edges of said electrodes.

5. A potential producing cell comprising a negative electrode, a positive electrode, an electrolyte contacting said electrodes and a molded methyl methacrylate polymer shell enclosing and hermetically sealing said electrodes and electrolyte.

6. A potential producing cell comprising a negative electrode, a positive electrode, an electrolyte contacting said electrodes and a molded methyl methacrylate polymer shell enclosing and hermetically sealing said electrodes and electrolyte, said methyl methacrylate polymer being moldable at a temperature below the boiling point of said electrolyte.

7. A potential producing cell comprising a negative electrode disc, a positive electrode disc in spaced parallel relation thereto, an electrolyte between said electrodes and in contact therewith and a molded methyl methacrylate polymer shell enclosing and hermetically sealing said electrodes and electrolyte therein.

8. A potential producing cell comprising a negative electrode disc, a positive electrode disc in spaced parallel relation thereto, an electrolyte between said electrodes and in contact therewith and a molded methyl methacrylate polymer shell enclosing and hermetically sealing said electrodes and electrolyte therein, said methyl methacrylate polymer shell sealing the edges of said electrodes.

9. A potential producing cell comprising a negative electrode disc, a positive electrode disc in spaced parallel relation thereto, an electrolyte between said electrode discs and in contact therewith on their adjacent surfaces, terminals in electrical contact with the non-adjacent surfaces of said electrodes and a molded resin shell enclosing and hermetically sealing said electrodes and electrolyte, said shell being bonded to the edges of said electrodes whereby to prevent electrolyte migration around said edges and onto said terminals.

10. A potential producing cell comprising a plurality of cell couples arranged in a stack assembly, each cell couple comprising a negative electrode disc, a positive electrode disc in spaced parallel relation thereto and an electrolyte between said discs and in contact therewith on their adjacent surfaces, the negative electrode disc of one of said couples being electrically connected to the positive electrode disc of the next adjacent couple, terminals connected to the negative and positive discs at the two ends of said stack assembly, and a molded resin shell enclosing and hermetically sealing said electrodes and electrolyte, said shell being bonded to the edges of said electrodes whereby to prevent electrolyte migration around said edges and into the regions between adjacent couples.

SAMUEL RUBEN.